(12) United States Patent
Gasca et al.

(10) Patent No.: US 7,657,142 B2
(45) Date of Patent: Feb. 2, 2010

(54) METHOD FOR MAKING AN OPTICAL FIBER COMPRISING NANOPARTICLES AND PREFORM USED IN THE MANUFACTURE OF SUCH A FIBER

(75) Inventors: Laurent Gasca, Villebon-sur-Yvette (FR); Stéphanie Blanchandin, Paris (FR); Alain Pastouret, Les Ulis (FR); Christian Simonneau, Villejuif (FR)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 12/066,776

(22) PCT Filed: Aug. 28, 2006

(86) PCT No.: PCT/FR2006/050816

§ 371 (c)(1),
(2), (4) Date: Jun. 22, 2008

(87) PCT Pub. No.: WO2007/031664

PCT Pub. Date: Mar. 22, 2007

(65) Prior Publication Data

US 2008/0285930 A1    Nov. 20, 2008

(30) Foreign Application Priority Data

Sep. 16, 2005    (FR) .................................. 05 52788

(51) Int. Cl.
G02B 6/036      (2006.01)
C03B 37/018    (2006.01)
C03B 37/023    (2006.01)

(52) U.S. Cl. ............................ 385/127; 65/385; 65/424

(58) Field of Classification Search ......... 385/123–128; 65/385, 413, 424; 264/1.24
See application file for complete search history.

(56) References Cited

U.S. PATENT DOCUMENTS

| 5,717,517 | A | 2/1998 | Alfano |
|---|---|---|---|
| 6,285,494 | B1 | 9/2001 | Weber |
| 6,723,435 | B1 | 4/2004 | Horne |
| 2001/0029756 | A1 | 10/2001 | Paek |
| 2003/0175003 | A1 | 9/2003 | Gasca |
| 2004/0187524 | A1 | 9/2004 | Sen et al. |
| 2005/0053345 | A1* | 3/2005 | Bayindir et al. ............. 385/123 |
| 2005/0111805 | A1 | 5/2005 | Hertz |
| 2006/0193582 | A1* | 8/2006 | Ouderkirk et al. ........... 385/126 |

FOREIGN PATENT DOCUMENTS

| AU |   | 712728 | B2 | 11/1999 |
|---|---|---|---|---|
| EP |   | 1043281 | A1 | 11/2000 |
| WO | WO | 00/20346 | A | 4/2000 |
| WO | WO | 03/033423 | A | 4/2003 |

* cited by examiner

*Primary Examiner*—Charlie Peng
(74) *Attorney, Agent, or Firm*—Harness, Dickey & Pierce, P.L.C.

(57) ABSTRACT

The invention concerns a method for making an optical fiber (18) including the following steps: producing a preform (10) containing nanoparticles provided with an active element including at least one recess (14) proximate at least part of the nanoparticles; fiber drawing of the preform (10) by introducing a non-oxidizing gas in the recess (14), thereby limiting the risks of oxidizing the nanoparticles of the preform (10). The preform (10) designed to the manufacture of an optical fiber (18) by the inventive method comprises nanoparticles provided with an active element in a doped zone (12) and at least one recess (14) proximate the doped zone (12).

12 Claims, 2 Drawing Sheets

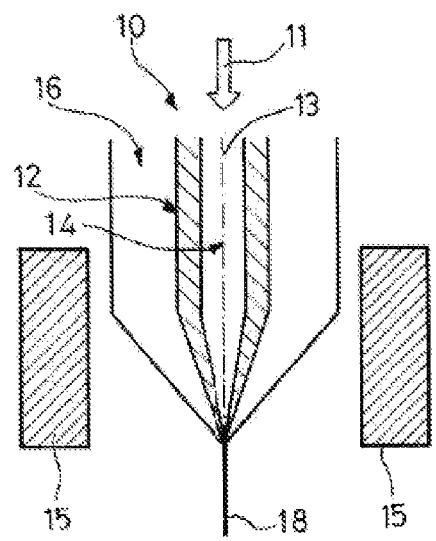
FIG_1
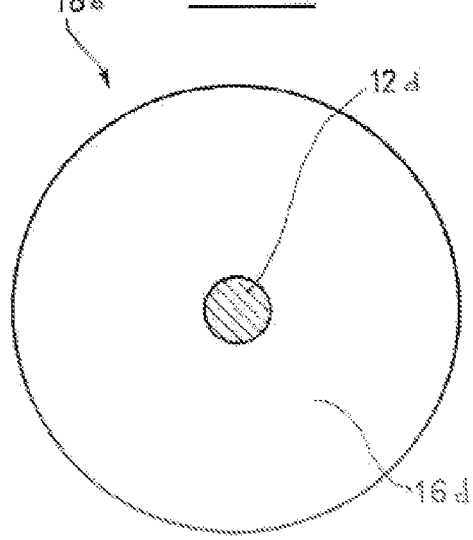
FIG_3a
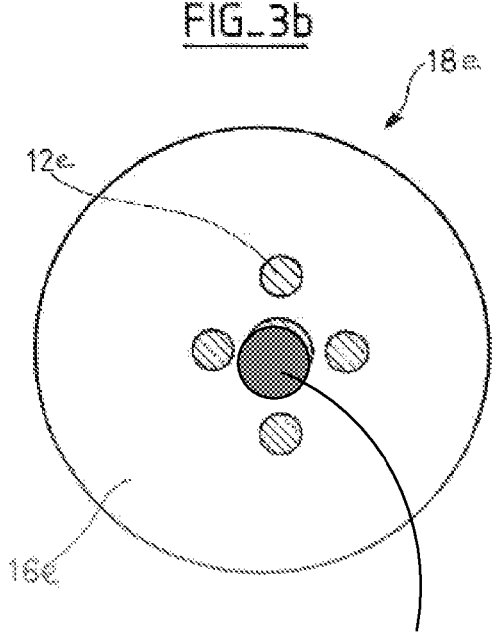
FIG_3b

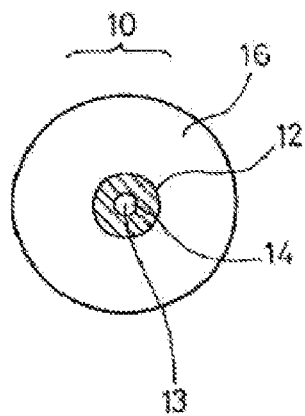
FIG_2a
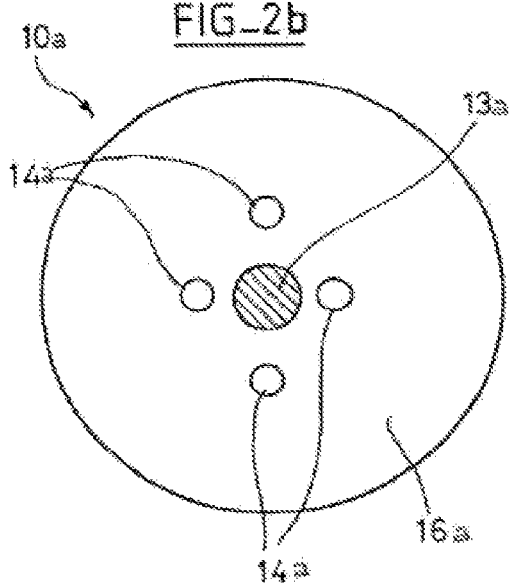
FIG_2b
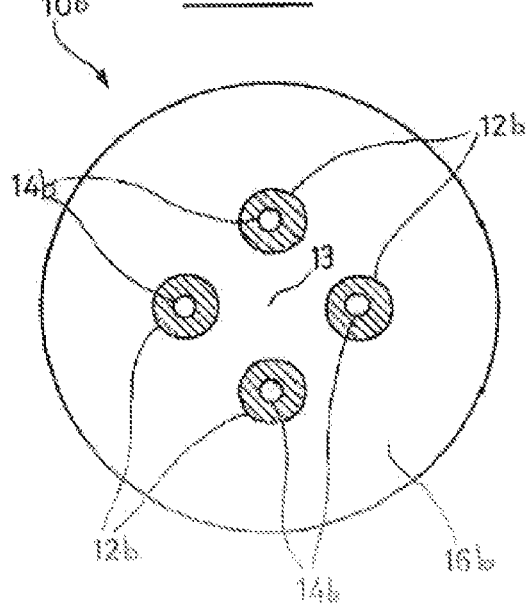
FIG_2c
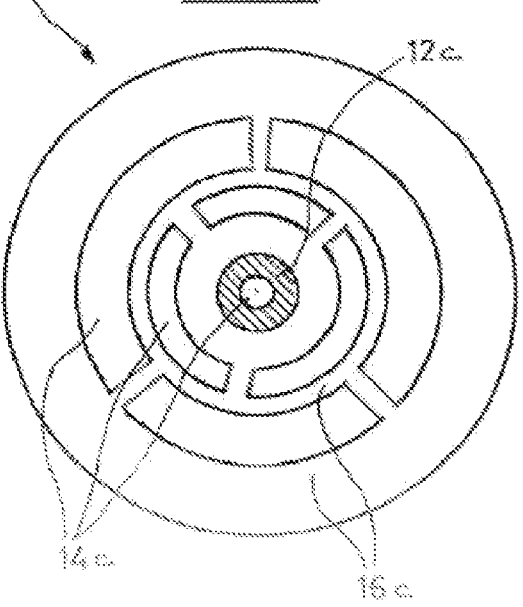
FIG_2d

METHOD FOR MAKING AN OPTICAL FIBER COMPRISING NANOPARTICLES AND PREFORM USED IN THE MANUFACTURE OF SUCH A FIBER

FIELD OF THE INVENTION

The present invention concerns a preform intended for manufacturing an optical fiber, as well as a method for manufacturing an optical fiber implementing such a preform.

PRIOR ART

In the field of telecommunications, it is known in the art how to use planar guides or optical fibers to transmit optical signals, by simultaneously processing these signals.

For example, an optical fiber may amplify the optical signal transmitted. To do so, such an amplifying fiber comprises a core, made up of a transparent material, and an active element, or doping agent, generally made from rare earth materials such as Er-ions, intended to amplify the intensity of the optical signal transmitted, and a cladding surrounding the core, intended to keep the majority of the optical signal within the core of the fiber.

The use of such an optical fiber may be improved by implementing nanoparticles within the core of the fiber, said nanoparticles comprising the active element and potentially other compounds that improve the functioning of said active element. The summary and usage of such nanoparticles are described, among other places, in US patent application US-2003/175,003.

SUMMARY OF THE INVENTION

The present invention includes the observation that nanoparticles, which may be implemented in planar guides, may not be implemented in optical fibers, given the very nature of the fiber manufacturing method.

In fact, the manufacture of an optical fiber includes first manufacturing a preform, which is drawn in a fiber-forming step to obtain a fiber. The preform which is implemented in the fiber-forming step normally takes the form of a cylindrical bar made of bulky material created from SiO2 silica. To manufacture preforms, a Modified Chemical Vapor Deposition (MCVD) method is commonly used inside a rotating silicate tube, depositing oxide particles which transform into silica glass. The bar obtained in this manner is heat-shrunk in order to obtain a solid preform. One particular embodiment based on this technique is described, among other places, in the document US-2004/187,524. Another known method (called OVD, for Outside Vapor Deposition) involves depositing silica-based particles on the outside surface of a part, such as a tube, so as to create overlapping layers of porous glass. The tube is then drawn, and the bar is heat-shrunk to obtain a solid preform, which will be implemented during the fiber-forming step. One particular embodiment based on this technique is described, among other places, in the document WO-00/20346.

Manufacturing fiber requires heat-treating the preform, which in the present case may contain nanoparticles. However, hear treatment is performed with temperatures greater than 500° C., and usually greater than 1000° C. These high temperatures lead to alterations in the composition and/or structure of these nanoparticles, and therefore in their properties.

The present invention also includes the observation that the alteration of the nanoparticles at high temperatures is mainly due to the oxidation of at least one of its components, such as silicon or germanium, whose form is stable in the form of oxides.

This is why the present invention pertains to a method of manufacturing an optical fiber comprising the following steps:

A preform is created, containing nanoparticles bearing an active element comprising at least one recess in the vicinity of at least part of the nanoparticles.

The preform is made into fibers by introducing a non-oxidizing gas into the recess, thereby limiting the chances that the nanoparticles in the preform will oxidize.

In one embodiment, the non-oxidizing gas is a reducing gas and/or a neutral gas.

In one particular embodiment, the non-oxidizing gas is a mixture of gas which is non-explosive at high temperatures, comprising hydrogen and a neutral gas such as helium.

In one embodiment, nanoparticles are introduced into the preform during its manufacture using a modified chemical vapor deposition method, diffusion impregnation, or a sol-gel method.

In one embodiment, the non-oxidizing gas is introduced into the preform's recess during at least one of the steps of the process for manufacturing said preform, so that the gas is present in the preform when its thermal treatment is performed.

The invention also pertains to a preform intended to be implemented during the fiber-producing step of the optical fiber manufacturing process, said preform comprising nanoparticles bearing an active element within a doped zone. The preform implemented in the method of the invention comprises at least one recess in the vicinity of at least part of the nanoparticles.

In this manner, a method using a preform in a manner consistent with the invention makes it possible to preserve the nanoparticles arranged in this preform, and keep them within a non-oxidizing environment during the preform's fiber-forming step. This environment is generated by a gas found in their vicinity, which heavily limits their oxidization and eliminates, or at least reduces, the alteration of nanoparticles in the core of the fiber.

Furthermore, a larger variety of nanoparticles may be implemented in manufacturing optical fibers, given that the environment to which these nanoparticles are subjected during the preform's fiber-forming step is less hostile. For this reason, it is possible to develop the usage of new fibers.

In one embodiment, the preform comprises a longitudinal axis and the recess is coaxial to said preform axis, which facilitates the flow of the reducing gas during the fiber-forming step across the entire length of the preform.

In one embodiment, the preform comprises a plurality of recesses that are coaxial to the preform's axis, which makes it possible to bring a non-oxidizing gas into the vicinity of a plurality of doped zones in the preform, among other possibilities.

In one embodiment, the preform comprises a plurality of recesses that form circles and/or arcs of circles that are concentric with respect to the axis of the preform, said embodiment allowing the preform to be manufactured in a simple manner.

In one embodiment, at least two recesses that form circles and/or arcs of circles are separated by a nanoparticle-free zone.

The invention also pertains to an optical fiber containing nanoparticles comprising an active element obtained using a method in accordance with one of the foregoing embodiments.

DESCRIPTION OF FIGURES

Other properties and advantages of the invention will become apparent with the description below, which is illustrative and non-limiting, of one embodiment of the invention, which makes reference to the attached figures, in which:

FIG. 1 is a diagram of a fiber-forming method implementing the invention,

FIGS. 2a, 2b, 2c, and 2d are cross-sections of performs which comply with the invention, and FIGS. 3a and 3b are cross-sections of fibers obtained using a fiber-forming process which complies with the invention.

DETAILED DESCRIPTION OF THE INVENTION

FIG. 1 depicts the obtaining of an optical fiber 18 via a method for forming fiber from a preform 10 in accordance with the invention, meaning that a non-oxidizing gas 11, such as a reducing gas, is kept in the vicinity of the doped zone 12 of the preform 10 by flowing into a recess 14 that is coaxial to the axis 13 of the preform 10.

In this manner, the nanoparticles included in the doped zone 12 of the material 16 of the preform 10 are protected from oxidization by the presence of this non-oxidizing gas 11 during the step in which fiber is formed from the preform 10, which is conducted using devices 15 that heat said preform.

By these means, the alteration of the composition and/or structure of the nanoparticles present in the doped areas 12 is heavily limited. In other words, the conditions to which the nanoparticles are subjected are less hostile, so that nanoparticles with various compositions can be used in the preform 10, and consequently, in the fiber 18 obtained from this preform 10.

In one embodiment, the non-oxidizing gas 11 is a mixture of a gas which is non-explosive at a high temperature, comprising hydrogen and a neutral gas such as helium. For example, the gas sold by the company Air Liquide under the name NOXAL may be used.

The preform 10 implemented in the method described with the assistance of FIG. 1 is depicted in cross-section in FIG. 2a, which, from a new perspective, shows the presence of the recess 14 in the vicinity of the doped zone 12 of the preform 10.

Such a preform in accordance with the invention may be embodied conventionally, by using one or more known techniques, such as Modified Chemical Vapor Deposition (MCVD), diffusion impregnation, or the sol/gel method.

Optical fiber 18d, illustrated in cross-section in FIG. 3a, which includes a glass structure 16a comprising a doped zone 12d, is obtained by a step of forming fiber out of the preform in FIG. 2a.

Other techniques may be implemented. In this manner, preforms 10a, 10b, and 10c, illustrated in FIGS. 2b, 2c, and 2d may be obtained through a glass assembly method, by a sol/gel method, or by extrusion.

Furthermore, it should be noted that the doped zones may be generated at the beginning and/or at the end of the preform manufacturing process. For example, the doped zones 12b of the preform 10b in FIG. 2c may be obtained either prior to manufacturing the preform 10b from doped tubular elements incorporated into a glass structure 16b, or after manufacturing the glass structure 16b of the preform 10b by adding one or more doped zones 12b, such as by using an MCVD method, using a dipping step or using a sol-gel layer method.

When an MCVD method is implemented to manufacture a preform 10 in accordance with the invention, it is necessary to maintain one recess that will allow the circulation of the non-oxidizing 11 in the vicinity of the doped zone 12 of the preform 10. The variant shown in FIG. 2b shows four recesses 14a surrounding a single doped zone 12a on a preform 10a, while FIG. 2x shows four recesses 14b bordering four respective doped areas 12b on another preform 10b. It should be noted that the apparent symmetry of the doped zones in these figures is generally not required to implement the invention.

In one variant, a plurality of recesses 14c, coaxial to the axis 13c of the preform 10c, are implemented, said recesses 14c being arranged symmetrically with respect to said axis 13c of the preform 10c.

This variant is illustrated by FIG. 2d, which shows a preform 10c in accordance with the invention, comprising six recesses 14c forming arcs of circles which are concentric and symmetrical with respect to the axis 13c of the preform 10c, said recesses 14c being separated by a nanoparticle-free layer of material 16c. In this example of a preform, the cylindrical symmetry of the doped zones 12c with respect to the axis of the preform 10c makes it possible to obtain a fiber with the same properties.

FIG. 3b illustrates the cross-section of an optical fiber 18e, which includes a glass structure 16e comprising nanoparticles-doped zones 12e and a central, conventionally-doped zone 13f, in order to enable guiding (germanium, phosphorus, etc.). This fiber may be obtained, for example, by a step of forming fiber out of the preform 10b in FIG. 2c.

Using the method of the present invention, it is also possible to manufacture photonic crystal fibers (PCF) that include holes obtained by forming fiber out of the performs obtained through a glass assembly method. To manufacture such PCF fibers, the fiber-forming should be performed with the non-oxidizing gas having pressure on the same order of magnitude as the atmospheric pressure, if not slightly higher. When the fiber is formed using non-oxidizing gas in the recesses with pressure lower than atmospheric pressure, the previously described fibers are obtained.

It should be noted that the nanoparticle-free material may be glass formed of silica or another type of glass, and that the doped zone comprises nanoparticles bearing an active element and/or a component such as erbium (Er), ytterbium (Yb), thulium (Tm), europium (Eu), cerium (Ce), chromium (Cr), manganese (Mn), bismuth (Bi), antimony (Sb), tellurium (Te), tantalum (Ta), zircon (Zr), niobium (Nb), vanadium (V), lead (Pb), tungsten (W), indium (In), gallium (Ga), tin (Sn), molybdenum (Mo), boron (B), arsenic (As), titanium (Ti), or aluminum (Al). In particular, the usage of Si nanoparticles is advantageous for erbium-doped amplifying fibers. The actual section where such nanoparticles are absorbed is in fact three orders of magnitude higher than that of erbium, which makes it possible to transfer optical energy to the erbium ions more efficiently.

Owing to the broad diversity of nanoparticles that can be implemented in a preform according to the invention, the uses of such fibers may be very diverse. For example, the following applications may be mentioned: rare earth-doped fiber for amplifiers or optical lasers, Raman fibers for amplifiers or optical lasers, heavily non-linear fibers, saturable absorbent fibers and/or polarizable fibers.

The present invention may be implemented in numerous variants. For example, the non-oxidizing gas may be introduced into the preform during different steps of manufacturing said preform.

The invention claimed is:

1. A method for manufacturing an optical fiber, comprising:
creating a preform, containing nanoparticles bearing an active element including at least one recess proximate to at least part of the nanoparticles; and
introducing a non-oxidizing gas into the recess, forming the fibers of the preform, thereby limiting the chances that the nanoparticles in the preform will oxidize.

2. The method according to claim 1, wherein the non-oxidizing gas is introduced into the recess during at least one of the steps of the process for manufacturing said preform.

3. The method according to claim 1, wherein the non-oxidizing gas is at least one of a reducing gas and a neutral gas.

4. The method according to claim 3, wherein the non-oxidizing gas is a mixture of gas which is non-explosive at high temperatures, including hydrogen and a neutral gas.

5. The method according to claim 1, wherein the nanoparticles are introduced into the preform during manufacture of the preform using one of a modified chemical vapor deposition method, diffusion impregnation and a sol-gel process.

6. A method according to claim 1, wherein the non-oxidizing gas is introduced into the recess during at least one of the steps of the process for manufacturing said preform, so that the non-oxidizing gas is present in the preform when thermal treatment of the preform is performed.

7. An optical fiber including the nanoparticles bearing the active element obtained using the method of claim 1.

8. A preform for implementing the method of claim 1, said preform comprising the nanoparticles bearing the active element within a doped zone, wherein said preform includes at least one recess proximate to at least part of the nanoparticles.

9. The preform according to claim 8, wherein the recess is coaxial to a longitudinal axis of the preform.

10. The preform according to claim 9, including a plurality of recesses that are coaxial to the longitudinal axis of the preform.

11. The preform according to claim 10, including a plurality of recesses that form at least one of circles and arcs of circles which are concentric with respect to the longitudinal axis of the preform.

12. The preform according to claim 11, wherein at least two recesses that form at least one of circles and arcs of circles are separated by a nanoparticle-free zone.

* * * * *